Dec. 13, 1966 H. MAGNUSKI 3,292,086

SYSTEM FOR CONVERTING A TRAIN OF BINARY ZEROES TO A TRAIN OF ALTERNATING ONES AND ZEROES AND VICE VERSA

Filed July 11, 1963

INVENTOR.
Henry Magnuski
BY Mueller & Aichele
Attys.

United States Patent Office 3,292,086

Patented Dec. 13, 1966

3,292,086

SYSTEM FOR CONVERTING A TRAIN OF BINARY ZEROES TO A TRAIN OF ALTERNATING ONES AND ZEROES AND VICE VERSA

Henry Magnuski, Glenview, Ill., assignor to Motorola, Inc., Chicago, Ill., a corporation of Illinois Filed July 11, 1963, Ser. No. 294,301
12 Claims. (Cl. 325—38)

This invention relates generally to radio communication systems, and more particularly to a binary pulse system wherein information such as voice is transmitted in digital form with a minimum number of pulses.

Pulse type voice communication systems have used various analog to digital conversions such as delta modulation systems, wherein information is represented by the presence and absence of pulses. A system of this type particularly adapted to provide a plurality of communications on a single channel is described and claimed in my application Serial No. 181,554, filed March 22, 1962. This system has been found to be very desirable in many applications. In this system, during times when there is no change in the modulating signal voltage, the pulse train transmitted includes alternate pulses and spaces, or considered in binary terminology, alternate ones (1) and zeros (0). Therefore transmitter power is required when no information is being transmitted.

It is an object of the present invention to provide a binary modulation system wherein no pulses are transmitted when no change occurs in the modulating voltage.

A further object of the invention is to provide a delta modulation communication system wherein the delta modulation pulse train is converted to a pulse train having fewer pulses under usual operating conditions.

Another object of the invention is to provide a pulse converting method and system wherein a delta modulation pulse train is converted at the transmitter to a pulse train having no pulses when there is no change in modulating voltage, and is converted back to the original delta modulation pulse train at the receiver, with the pulse train at the receiver being substantially the same as the original delta modulation pulse train.

Another object of the invention is to reduce the average transmitter power in a delta modulation voice communication system to approximately one-half without losing the advantages of delta modulation, by replacing, for transmission purposes, the delta modulation pulse train by a derived pulse train containing fewer pulses, and converting it back to the delta modulation pulse train at the receiver.

Still another object of the invention is to provide better spectrum utilization in a radio communication system, such as the Random Access System described in my application Serial No. 181,554 by transmitting fewer pulses, thus reducing the interference to other coexisting transmissions and/or permitting more simultaneous transmissions to exist over the same channel.

A feature of the invention is the provision of a pulse train converting system including a shift register with a plurality of stages to which the pulses are applied, and which control gates for passing pulses to the output when pulses are applied in a particular sequence.

Another feature of the invention is the provision of a pulse converting system including a shift register with three stages coupled to first and second gates, wherein the first gate is operated to block the passage of a pulse which is preceded and followed by a "no pulse" or zero (010) binary signal, and the second gate is rendered operative to apply a pulse to the output coincidence with a "no pulse" or zero signal which is preceded and followed by other "no pulse" or zero (000) binary signals.

Another feature of the invention is the provision of a pulse converting system for converting a train of binary pulses to a second train having fewer pulses and which includes a shift register with four stages, the last three of which are operated in accordance with the system described in the preceding paragraph, and which cooperate with the first stage to recognize a binary zero, zero, one, zero (0010) pattern in the pulse train, and to allow the one (1) pulse in this group to pass to the output. The pulse train so derived can be converted to the original pulse train by applying the same to an identical converting system, and the produced pulse train will be substantially identical to the original pulse train.

The invention is illustrated in the drawings wherein.

Figure 1:
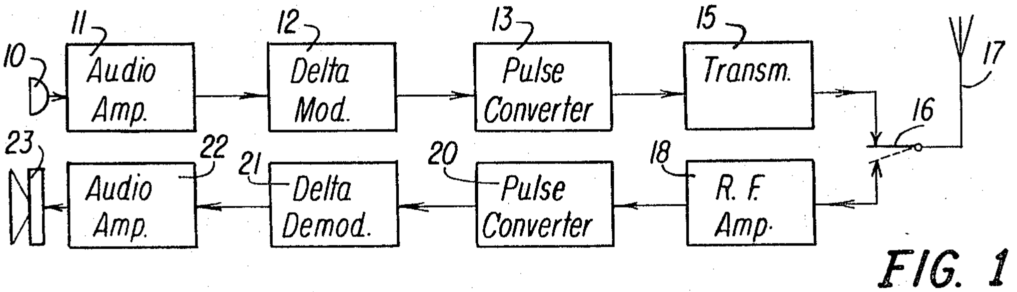
FIG. 1 is a block diagram of a delta modulation transmitter and receiver system including the pulse converter system of the invention.

In practicing the invention there is provided a pulse train converting method and system which may be used in a delta modulation communication system. In accordance with this method and system the number of pulses in a pulse train is reduced without reducing the amount of information therein. This is accomplished by sampling a plurality of adjacent pulse positions to determine the presence and absence of pulses therein, and for producing a derived output pulse train in accordance with the sampled pulses. In one embodiment of the invention three adjacent spaces are sampled by a three stage shift register. The three stages control two gates the first of which is operative to block the passage of a pulse or binary 1 when it is preceded and followed by "no pulse" or binary 0. This converts a 010 pulse sequence into a 000 pulse sequence. The second gate responds to a 000 pulse sequence to insert a pulse in the center position so that a 010 pulse group is provided. The same pulse converting system can be used to restore the derived pulse train into a pulse train of the original form.

In certain pulse sequences, the conversion of the pulse trains as described in the preceding paragraph results in pulses being moved in the restored pulse train, and sometimes added or omitted. The conversion can be rendered more accurate by sampling a fourth pulse position by the addition of a fourth stage in the shift register. An additional gate is controlled by the stages to recognize a 0010 pulse pattern, and in such case to transmit the one (1) pulse in this group in the derived pulse train. This pulse would not be transmitted in the system with three stages as previously described. This results in exactly the same number of pulses in the restored pulse train, but there is some possibility that a pulse may be shifted in position in the train.

The following table indicates the change in the delta modulation pulse trains produced by the system of the invention under various conditions:

| Modulating Voltage | Delta Modulation Pattern | Derived Delta Modulation Pattern | Restored Delta Modulation Pattern |
|---|---|---|---|
| Increasing | 1 1 1 1 1 1 1 1 | 1 1 1 1 1 1 1 1 | 1 1 1 1 1 1 1 1 |
| Decreasing | 0 0 0 0 0 0 0 0 | 1 0 1 0 1 0 1 0 | 0 0 0 0 0 0 0 0 |
| No Change | 1 0 1 0 1 0 1 0 | 0 0 0 0 0 0 0 0 | 1 0 1 0 1 0 1 0 |

In delta modulation, a continuous train of 1 pulses designates the rapid increase in modulating (voice) voltage as shown in the above table. Likewise, a continuous 0 pattern designates a rapid decrease in modulating voltage. When no change in modulating voltage occurs at the input to the delta modulator, the 1010 pattern as shown above results, which means that one step voltage increase is always followed by one step voltage decrease, having a net result of no change in voltage. This last pattern (of line 3) is quite frequently present in delta modulation, and may exist about 50% of the time. It has been shown by experiments that the human voice level drops below the level acceptable to the delta modulator about 35% of the time, and about 15% of the time the modulating voltage changes so slowly that this pattern is again provided. Since this pattern transmits pulses, it is advantageous to exchange this pattern for the pattern 0000, which does not require any transmitter power. The system of the invention exchanges the patterns for decreasing signals and for no change in signals for transmission, and restores the original patterns at the receiver for reproduction of the delta modulation.

Referring now to the drawings, in FIG. 1 there is shown a transmitter and receiver system wherein signals are applied from microphone 10 through audio amplifier 11 to delta modulator 12. The delta modulator produces a pulse train from the modulating voltage in known manner. The pulse train from the delta modulator is applied to the pulse train converter 13 which is constructed in accordance with the invention. The converted pulse train is applied to the transmitter 15. The output of the transmitter is applied through switch 16 to antenna 17.

The switch 16 is shown in the transmitting position but may be moved to the dotted receiving position to apply signals picked up by antenna 17 to the radio frequency amplifier 18. The signals from the radio frequency amplifier are detected and applied to pulse train converter 20, constructed in accordance with the invention, which restores the delta modulation pulse train and applies the same to delta demodulator 21. The audio signal from delta demodulator 21 is applied to audio amplifier 22 and may be reproduced by loudspeaker 23. The system described in FIG. 1 may be in accordance with my application Serial No. 181,554 referred to above, with the pulse converters 13 in the transmitter and 20 in the receiver being constructed in a manner to be described.

Figures 2, 3:
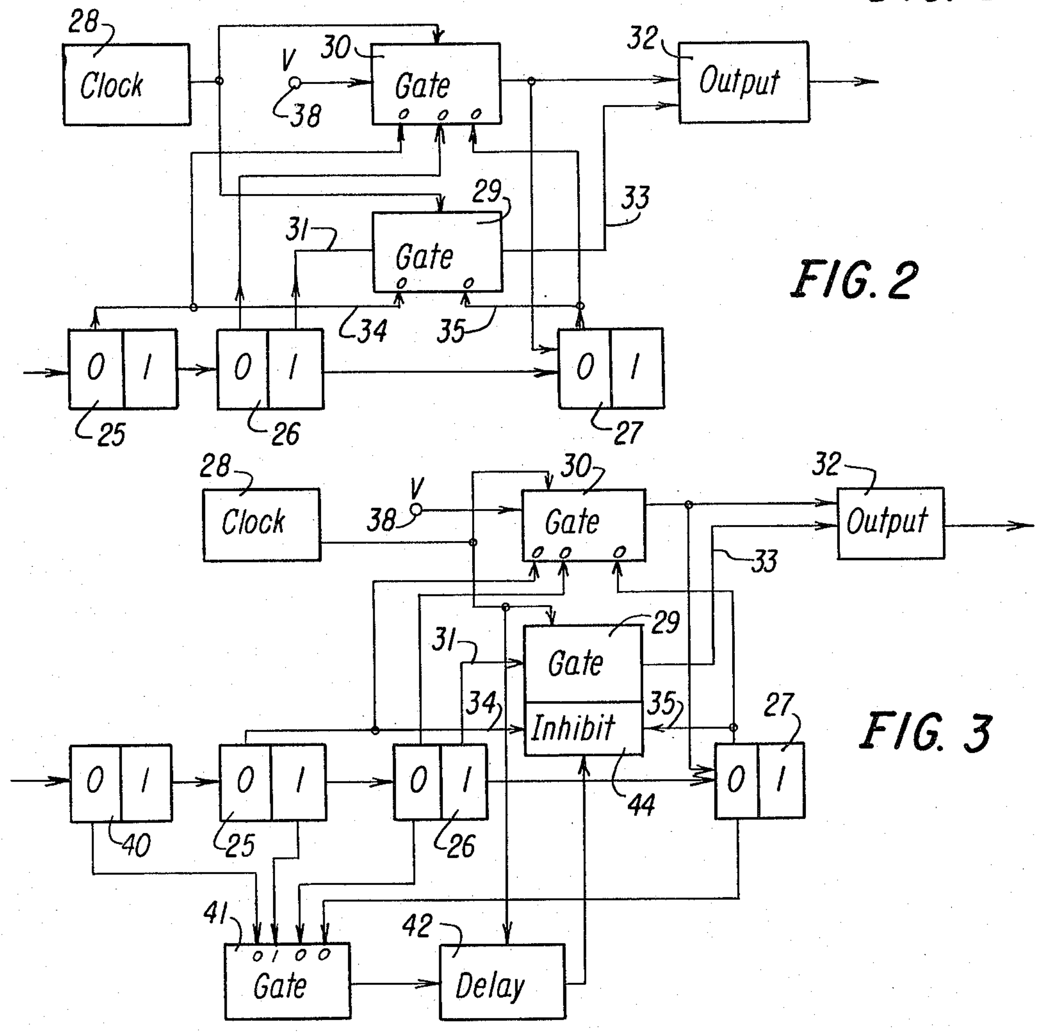
FIG. 2 is a block diagram of a three stage pulse converter system.
FIG. 3 is a block diagram of a four stage pulse converter system.

FIG. 2 illustrates in block diagram form one embodiment of the pulse converter in accordance with the invention. This may be the pulse converter 13 or the pulse converter 20 in the system as the two converters may be identical. Signals from delta modulator 12 are applied to the three stages 25, 26 and 27 of a shift register. In some cases the first stage 25 may also serve as the output stage of the delta modulator 12. Each of the stages 25, 26 and 27 have two sections, one of which is energized wherein there is a "no pulse" or binary 0, and this is indicated by 0 on the left side of each stage. The right section of each stage marked 1 is energized when a pulse or binary 1 is applied to that stage of the shift register.

Coupled to the stages 25, 26 and 27 are gates 29 and 30. A clock 28 applies pulses to each of the gates 29 and 30, so that the gates can be actuated only in synchronism with the pulses applied to the stages 25, 26 and 27 of the shift register. The clock 28 may be a part of the delta modulator 12 and the pulses therefrom are in synchronism with the pulses from the delta modulator. The clock 28 is also coupled to the stages 25, 26 and 27 in a well known manner.

The input to gate 29 is derived from the 1 output of register stage 26 to conductor 31. Accordingly, when a 1 is applied to the stage 26, this stage will apply a pulse to the input of the gate 29. The gate 29 is normally open to apply the pulse through output conductor 33 to the output stage 32 of the converter system. The gate 29 is controlled by the shift register stages 25 and 27. The 0 output from stage 25 is applied on conductor 34 and the 0 output from stage 27 is applied through conductor 35 to gate 29. Gate 29 responds to pulses applied simultaneously on conductors 34 and 35 to block the passage of a pulse from its input to its output. Therefore the 010 pulse sequence is converted to a 000 sequence.

The gate 30 has a voltage applied thereto from terminal 38. This gate is normally closed so that the voltage is not applied through the gate to the output stage 32. Inputs are applied to the gate 30 from the 0 sections of shift registers 25, 26 and 27. When three 0's are present in succession the gate 30 is open to apply a pulse to the output 32. The gate 30 therefore inserts a pulse in the center position of a 000 sequence to provide a 010 output pulse group. It is pointed out that each sequence of three includes two from the prior sequence and the next pulse applied at the input.

In order that a continuous sequence of 1 pulses will not be produced by output stage 32 in response to a continuous sequence of 0's applied to the converter, the register stage 27 is actuated by the output of gate 30 to insert a pulse, or a binary 1, when the gate 30 is operated. This will change the following 000 pulse sequence to a 100 pulse sequence. Accordingly the gate 30 will not operate to apply a pulse to the output stage 32. If a second 000 sequence occurs, a 1 will not be inserted by the stage 27 so that the gate 30 will open. Therefore, a series of 0's will produce a pulse train with alternating 1's and 0's.

The following is an example of the operation of the system described in FIG. 2:

| | | | | | | | | | | | | | | | | | |
|---|---|---|---|---|---|---|---|---|---|---|---|---|---|---|---|---|---|
| | | | | | | | | | | | | | | 1 | | 1 | |
| Original pulse train | 1 | 1 | 0 | 1 | 0 | 1 | 0 | 0 | 1 | 0 | 0 | 1 | 0 | 0 | 0 | 0 | 0 |
| | | | | 1 | | 1 | | 1 | | 1 | | 1 | | | | | |
| Derived pulse train | 1 | 1 | 0 | 0 | 0 | 0 | 0 | 0 | 0 | 0 | 0 | 0 | 0 | 1 | 0 | 1 | 0 |
| Restored pulse train | 1 | 1 | 0 | 1 | 0 | 1 | 0 | 1 | 0 | 1 | 0 | 1 | 0 | 0 | 0 | 0 | 0 |

In the above, 1's are placed above the 0's when these are added by stage 27 for considering the next group of three. It will be noted that the restored pulse train is generally similar to the original pulse train but in the example mentioned above an additional 1 is added to the restored pulse train. Also some of the 1's are shifted in position with respect to the original pulse train.

In order to provide a system for reducing the number of pulses for transmission, and which provides a restored pulse train which is more accurate than that produced by the system of FIG. 2, a somewhat more complex converting system may be used as shown in FIG. 3. The system of FIG. 3 includes all of the elements of FIG. 2 and additional elements. The three shift register stages 25, 26 and 27 cooperate with the gates 29 and 30 to provide pulses to the output stage 32 in the manner described above. The additional elements in FIG. 3 are provided to prevent the removal of a 1 pulse from the derived pulse train under certain conditions.

The system of FIG. 3 samples four binary elements instead of three as in FIG. 2. For this reason an additional shift register stage 40 is provided which looks at the fourth pulse position in the sequence, while the stages 25, 26 and 27 look at the first three pulses as previously described. In brief, the system of FIG. 3 adds a pulse at the output when the pulse group 0010 appears in the stages 40, 25, 26 and 27.

Considering the system of FIG. 3 in detail, inputs are provided to gate 41 from the shift register stages 40, 25, 26 and 27. It will be noted that the connections to the stages are such that all four connections to the gate 41 are energized when the pulse group in the registers is a 0010 group. When gate 41 is thus actuated it will actuate the stage 42 which acts to remember the particular pulse group. Stage 42 is connected to inhibit stage 44 through which pulses are applied to gate 29. Stage 42 applies a pulse to stage 44 after a delay of one step, so that when the 1 pulse in the 0010 moves from stage 25 to 26, the pulse from stage 42 will apply a pulse to stage 44 to inhibit the action of stages 25 and 27 on gate 29, and this gate will pass the 1 pulse now in stage 26. This preserves the 1 pulse in the 0010 group so that it appears in the derived pulse train. Stage 42 is connected to the clock 28 so that the one step delay is correctly timed. Stage 42 is reset when it applies a pulse to stage 44 so that it is ready for the next action.

We will now consider the same original pulse train as considered in describing the operation of the system of FIG. 2, and note the difference in the derived and restored pulse trains obtained when using the system of FIG. 3.

```
                                                       1   1
Original pulse train---------------- 1 1 0 1 0 1 0 0 1 0 0 1 0 0 0 0 0

                                           1   1
Derived pulse train----------------- 1 1 0 0 0 0 0 0 1*0 0 1*0 1 0 1 0

Restored pulse train---------------- 1 1 0 1 0 1 0 0 1*0 0 1*0 0 0 0 0
```

It will be noted that in the derived pulse train, the 1's marked by asterisks are added by the system of FIG. 3, not being provided in the derived pulse train by the system of FIG. 2. In the restored pulse train, the 1's marked with asterisks are again preserved, and it will be noted that the position and number of pulses is the same as in the original pulse train. An additional pulse is not inserted as in the system of FIG. 2.

The pulse converting system of the invention has been found to be effective to reduce the number of pulses required for radio transmission of delta modulation signals. Under normal speech conditions the number of pulses is reduced to less than half the number included in the original delta modulation pulse train. This permits a substantial saving in power of the radio transmitter, permits more simultaneous transmissions in the same channel.

The relatively simple system illustrated in FIG. 2 is suitable for many applications wherein small errors in the restored pulse train do not substantially affect the intelligibility of the reproduced audio. The system illustrated in FIG. 3 provides a restored pulse train which is highly accurate, and the derived pulse train which is transmitted has the same advantage of greatly reduced number of pulses as compared to the original and restored pulse trains.

I claim:

1. In a binary pulse system wherein information is represented by a first pulse train including a series made up to 1 and 0 binary pulses and wherein 1 and 0 pulses are provided in alternation in the absence of information, the method of deriving a second pulse train wherein no 1 pulses are present in the absence of information from the first pulse train including the steps of, sampling three adjacent pulse positions of the first pulse train to determine the presence of 1 and 0 pulses, converting a 010 pulse sequence in the first pulse train into a 000 pulse sequence in the second pulse train, and converting a 000 pulse sequence in the first pulse train into a 010 pulse sequence in the second pulse train.

2. In a binary pulse system wherein information is represented by a first pulse train including a series made up of 1 and 0 binary pulses and wherein 1 and 0 pulses are provided in alternation in the absence of information, the method of deriving a second pulse train wherein no 1 pulses are present in the absence of informatioin from the first pulse train including the steps of, sampling three adjacent pulse positions of the first pulse train, converting a 010 pulse sequence in the first pulse train into a 000 pulse sequence in the second pulse train, converting a 000 pulse sequence in the first pulse train into a 010 pulse sequence in the second pulse train, and modifying a second successive 000 pulse sequence in the first pulse train to form a 100 pulse sequence to prevent successive 1's in the second pulse train resulting from successive 000 pulse sequences in the first pulse train.

3. In a binary pulse system wherein information is represented by a first pulse train including a series made up of 1 and 0 binary pulses and wherein 1 and 0 pulses are provided in alternation in the absence of information, the method of deriving a second pulse train wherein no 1 pulses are present in the absence of information from the first pulse train including the steps of, sampling three adjacent pulse positions of the first pulse train, converting a 010 pulse sequence in the first pulse train into a 000 pulse sequence in the second pulse train, converting a 000 pulse sequence in the first pulse train into a 010 pulse sequence in the second pulse train, sampling four adjacent pulse positions including said three pulse positions to recognize a 0010 pulse sequence, and preserving the 1 pulse of the 0010 pulse sequence in the second pulse train.

4. In a communication system wherein information is represented by a first binary pulse train including a series made up of 1 and 0 binary pulses, and wherein 1 and 0 pulses are provided in alternation in the absence of information, the method of transmitting the information by a pulse train in which no 1 pulses are present in the absence of information including the steps of, sampling three adjacent pulse positions of the first pulse train, converting a 010 pulse sequence in the first pulse train into a 000 pulse sequence in the second pulse train, converting a 000 pulse sequence in the first pulse train into a 010 pulse sequence in the second pulse train, transmitting the second pulse train, receiving the second pulse train, sampling three adjacent positions of the received second pulse train, converting a 010 pulse sequence in the second pulse train into a 000 pulse sequence, and converting a 000 pulse sequence in the second pulse train into a 010 pulse sequence.

5. In a communication system wherein information is represented by a first binary pulse train including a series made up of 1 and 0 binary pulses and wherein 1 and 0 pulses are provided in alternation in the absence of information, the method of transmitting the information by a pulse train in which no 1 pulses are present in the absence of information including the steps of, sampling three adjacent pulse positions of the first pulse train, converting a 010 pulse sequence in the first pulse train into a 000 pulse sequence in a second pulse train, converting a 000 pulse sequence in the first pulse train into a 010 pulse sequence in the second pulse train, modifying a second successive 000 pulse sequence in the first pulse train to form a 100 pulse sequence so that successive 000 pulse sequences do not produce successive 1's in the second pulse train, transmitting the second pulse train, receiving the second pulse train, sampling three adjacent positions of the received second pulse train, converting a 010 pulse sequence in the second pulse train into a 000 pulse sequence in a third pulse train, converting a 000 pulse sequence in the second pulse train into a 010 pulse sequence in the third pulse train, and modifying a second successive 000 pulse sequence in the second pulse train to form a 100 pulse sequence so that successive 000 pulse sequences do not produce successive 1's in the third pulse train.

6. In a communication system wherein information is represented by a first binary pulse train including a series made up of 1 and 0 binary pulses and wherein 1 and 0 pulses are provided in alternation in the absence of information, the method of transmitting the information by a pulse train in which no 1 pulses are present in the absence of information including the steps of, sampling three adjacent pulse positions of the first pulse train, converting a 010 pulse sequence in the first pulse train into a 000 pulse sequence in the second pulse train, converting a 000 pulse sequence in the first pulse train into a 010 pulse sequence in the second pulse train, sampling four adjacent pulse positions of the first pulse train including said three positions to recognize a 0010 pulse sequence in the first pulse train, preserving the 1 pulse of the 0010 pulse sequence in the second pulse train, transmitting the second pulse train, receiving the second pulse train, sampling three adjacent positions of the received second pulse train, converting a 010 pulse sequence in the second pulse train into a 000 pulse sequence in a third pulse train, converting a 000 pulse sequence in the second pulse train to a 010 pulse sequence in the third pulse train, sampling four adjacent pulse positions of the second pulse train including said three positions thereof to recognize a 0010 pulse sequence in the second pulse train, and preserving the 1 pulse of the 0010 pulse sequence in the third pulse train.

7. A pulse converting system for deriving from a first binary pulse train including a series made up of 1 and 0 binary pulses, a second pulse train made up of such pulses, and wherein said first pulse train includes 1 and 0 pulses provided in alternation in the absence of information, and the second pulse train includes no 1 pulses in the absence of information, said converting system including in combination, a shift register including first, second and third stages to which the first binary pulse train is applied, output circuit means, voltage supply means, first gate means having an input connected to said second stage and an output connected to said output circuit means for applying a 1 pulse in said second stage to said output circuit means, means connecting said first and third stages to said first gate means for blocking the latter when 0 pulses are present in said first and third stages, so that a 010 pulse sequence in the first pulse train is converted to a 000 pulse sequence in the second pulse train, second gate means having an input connected to said voltage supply means and an output connected to said output circuit means, and means connecting said first, second and third stages to said second gate means for causing the latter to apply a pulse to said output circuit means when a 0 pulse is present in each of said stages, so that a 000 pulse sequence in the first pulse train is converted into a 010 pulse sequence in the second pulse train.

8. A pulse converting system for converting a first binary pulse train including a series made up of 1 and 0 binary pulses into a second pulse train made up of such pulses, and wherein said first pulse train includes 1 and 0 pulses provided in alternation in the absence of information, and the second pulse train includes no 1 pulses in the absence of information, said converting system including in combination, a shift register including first, second and third stages to which the binary pulses are applied in sequence, output circuit means, voltage supply means, first gate means having an input connected to said second stage and an output connected to said output circuit means for applying a 1 pulse in said second stage to said output circuit means, means connecting said first and third stages to said first gate means for blocking the latter when 0 pulses are present in said first and third stages, so that a 010 pulse sequence in the first pulse train is converted to a 000 pulse sequence in the second pulse train, second gate means having an input connected to said voltage supply means and an output connected to said output circuit means, and means connecting said first, second and third stages to said second gate means for causing the latter to apply a pulse to said output circuit means when a 0 pulse is present in each of said stages, so that a 000 pulse sequence in the first pulse train is converted into a 010 pulse sequence in the second pulse train, and means connecting said second gate means to said first stage for applying a 1 pulse thereto when a pulse is applied by said second gate means to said output circuit means, so that a continuous repetition of 0 pulses in the first pulse train produces alternate 1 and 0 pulses in the second pulse train.

9. A pulse converting system for converting a first binary pulse train including a series made up of 1 and 0 binary pulses into a second pulse train made up of such pulses, and wherein said first pulse train includes 1 and 0 pulses provided in alternation in the absence of information, and the second pulse train includes no 1 pulses in the absence of information, said converting system including in combination, a shift register including first, second and third stages to which the binary pulses are applied in sequence, each of said stages being in a first condition and operating to a second condition when a 1 pulse is applied thereto, output circuit means, voltage supply means, clock means providing timing pulses, first gate means coupled to said clock means and having an input connected to said second stage and an output connected to said output circuit means for applying a 1 pulse in said second stage to said output circuit means, means connecting said first and third stages to said first gate means and responsive to said first condition of said stages for blocking said first gate means when 0 pulses are present in said first and third stages, so that a 010 pulse sequence in the first pulse train is converted to a 000 pulse sequence in the second pulse train, second gate means coupled to said clock means and having an input connected to said voltage supply means and an output connected to said output circuit means, and means connecting said first, second and third stages to said second gate means and responsive to said first condition of said stages for causing said second gate means to apply a pulse to said output circuit means when a 0 pulse is present in each of said stages, so that a 000 pulse sequence in the first pulse train is converted into a 010 pulse sequence in the second pulse train, and means connecting said second gate means to said first stage for applying a 1 pulse thereto when a pulse is applied by said second gate means to said output circuit means, so that a continuous repetition of 0 pulses in the first pulse train produces alternate 1 and 0 pulses in the second pulse train.

10. A pulse converting system for converting a first binary pulse train including a series made up of 1 and 0 binary pulses into a second pulse train made up of such pulses, and wherein said first pulse train includes 1 and 0 pulses provided in alternation in the absence of information, and the second pulse train includes no 1 pulses in the absence of information, said converting system including in combination, a shift register including first, second, third and fourth stages to which the binary pulses are applied in sequence, output circuit means, voltage supply means, first gate means having an input connected to said second stage and an output connected to said output circuit means for applying a 1 pulse in said second stage to said output circuit means, means connecting said first and third stages to said first gate means for blocking the latter when 0 pulses are present in said first and third stages, so that a 010 pulse sequence in the first pulse train is converted to a 000 pulse sequence in the second pulse train, second gate means having an input connected to said voltage supply means and an output connected to said output circuit means, means connecting said first, second and third stages to said second gate means for causing the latter to apply a pulse to said output circuit means when a 0 pulse is present in each of said stages, so that a 000 pulse sequence in the first pulse train is converted into a 010 pulse sequence in the second pulse train, third gate means coupled to said first, second, third and fourth stages, said third gate means being responsive to a 0010 pulse sequence in said stages, and means coupled to said first and third gate means for actuating said first gate means to apply a pulse to said output circuit means in response to operation of said third gate.

11. A pulse converting system for converting a first binary pulse train including a series made up of 1 and 0 binary pulses into a second pulse train made up of such pulses, and wherein said first pulse train includes 1 and 0 pulses provided in alternation in the absence of information, and the second pulse train includes no 1 pulses in the absence of information, said converting system including in combination, a shift register including first, second, third and fourth stages to which the binary pulses are applied in sequence, output circuit means, voltage supply means, first gate means having an input connected to said second stage and an output connected to said output circuit means for applying a 1 pulse in said second stage to said output circuit means, means connecting said first and third stages to said first gate means for blocking the latter when 0 pulses are present in said first and third stages, so that a 010 pulse sequence in the first pulse train is converted to a 000 pulse sequence in the second pulse train, second gate means having an input connected to said voltage supply means and an output connected to said output circuit means, means connecting said first, second and third stages to said second gate means for causing the latter to apply a pulse to said output circuit means when a 0 pulse is present in each of said stages, so that a 000 pulse sequence in the first pulse train is converted into a 010 pulse sequence in the second pulse train, means connecting said second gate means to said first stage for applying a 1 pulse thereto when a pulse is applied by said second gate means to said output circuit means, so that a continuous repetition of 0 pulses in the first pulse train produces alternate 1 and 0 pulses in the second pulse train, third gate means coupled to said first, second, third and fourth stages, said third gate means being responsive to a 0010 pulse sequence, inhibit means coupled to said first and third stages and to said first gate means for inhibiting the action of said first and second stages on said first gate means, and delay means coupling said third gate means to said inhibit means for applying a pulse to said inhibit means after a delay of one step so that said first gate means applies the 1 pulse of said 0010 pulse sequence from said second stage to said output circuit means in response to operation of said third gate means after a delay of one step.

12. A pulse converting system for converting a first binary pulse train including a series made up of 1 and 0 binary pulses into a second pulse train made up of such pulses, and wherein said first pulse train includes 1 and 0 pulses provided in alternation in the absence of information, and the second pulse train includes no 1 pulses in the absence of information, said converting system including in combination, a shift register including first, second, third and fourth stages to which the binary pulses are applied in sequence, each of said stages being in a first condition and operating to a second condition when a 1 pulse is applied thereto, output circuit means, voltage supply means, first gate means having an input connected to said second stage and an output connected to said output circuit means for applying a 1 pulse in said second stage to said output circuit means, coupling means connecting said first and third stages to said first gate means and responsive to said first condition of said stages for blocking said first gate means when 0 pulses are present in said first and third stages, so that a 010 pulse sequence in the first pulse train is converted to a 000 pulse sequence in the second pulse train, second gate means having an input connected to said voltage supply means and an output connected to said output circuit means, means connecting said first, second and third stages to said second gate means and responsive to said first condition of said stages for causing said second gate means to apply a pulse to said output circuit means when a 0 pulse is present in each of said stages, so that a 000 pulse sequence in the first pulse train is converted into a 010 pulse sequence in the second pulse train, means connecting said second gate means to said first stage for applying a 1 pulse thereto when a pulse is applied by said second gate means to said output circuit means, so that a continuous repetition of 0 pulses in the first pulse train produces alternate 1 and 0 pulses in the second pulse train, third gate means coupled to said first, second, third and fourth stages, delay means providing a delay of one step, said third gate means being coupled to said delay means and responsive to a 0010 pulse sequence to actuate said delay means, and means connecting said delay means to said coupling means to prevent the blocking of said first gate means after a delay of one step, whereby the 1 pulse of said 0010 pulse sequence is passed from said third stage to said second stage during said step and is applied from said second stage through said first gate means to said output circuit means.

No references cited.

DAVID G. REDINBAUGH, *Primary Examiner.*

J. T. STRATMAN, *Assistant Examiner.*